(12) United States Patent
Choyi et al.

(10) Patent No.: US 12,556,912 B2
(45) Date of Patent: Feb. 17, 2026

(54) SYSTEMS AND METHODS FOR PROVISIONING SECURITY POLICIES FOR DERIVING SESSION KEYS

(71) Applicant: Verizon Patent and Licensing Inc., Basking Ridge, NJ (US)

(72) Inventors: Vinod Kumar Choyi, Conshohocken, PA (US); Shanthala Kuravangi-Thammaiah, Keller, TX (US); Yousif Targali, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 237 days.

(21) Appl. No.: 18/343,483

(22) Filed: Jun. 28, 2023

(65) Prior Publication Data

US 2025/0008323 A1 Jan. 2, 2025

(51) Int. Cl.
*H04W 12/0433* (2021.01)
*H04L 9/40* (2022.01)
*H04W 12/041* (2021.01)
*H04W 12/30* (2021.01)

(52) U.S. Cl.
CPC ......... *H04W 12/0433* (2021.01); *H04L 63/20* (2013.01); *H04W 12/041* (2021.01); *H04W 12/35* (2021.01)

(58) Field of Classification Search
CPC ................................................ H04W 12/0433
See application file for complete search history.

(56) References Cited

U.S. PATENT DOCUMENTS

| | | | | |
|---|---|---|---|---|
| 11,553,381 | B2* | 1/2023 | Palanigounder | H04W 12/0431 |
| 12,143,812 | B2* | 11/2024 | Kunz | H04W 12/0431 |
| 12,316,757 | B2* | 5/2025 | You | H04L 63/06 |
| 12,401,998 | B2* | 8/2025 | Rohini | H04W 12/08 |
| 2019/0253889 | A1* | 8/2019 | Wu | H04W 12/04 |
| 2021/0273923 | A1* | 9/2021 | Zhang | H04W 12/10 |
| 2021/0392495 | A1* | 12/2021 | Tsiatsis | H04W 12/40 |
| 2022/0159460 | A1* | 5/2022 | Ben Henda | H04W 12/084 |
| 2022/0345888 | A1* | 10/2022 | Yu | H04L 9/083 |
| 2023/0199486 | A1* | 6/2023 | Wang | H04W 12/0431 726/6 |
| 2023/0247423 | A1* | 8/2023 | Kunz | H04W 12/06 455/410 |
| 2023/0354037 | A1* | 11/2023 | Rohini | H04W 76/14 |
| 2024/0080662 | A1* | 3/2024 | Suh | H04W 12/037 |
| 2024/0121606 | A1* | 4/2024 | Zhou | H04L 9/3242 |
| 2024/0413986 | A1* | 12/2024 | Ambekar | H04L 9/0825 |
| 2025/0150817 | A1* | 5/2025 | Guo | H04L 63/0272 |
| 2025/0193771 | A1* | 6/2025 | Baskaran | H04W 12/108 |

* cited by examiner

*Primary Examiner* — Viral S Lakhia

(57) ABSTRACT

In some implementations, an key management server function (KMSF) may generate a security policy, wherein the security policy is an application function (AF)-specific security policy or a network function (NF)-specific security policy. The KMSF may transmit, to one of an AF or an NF, the security policy, wherein the AF-specific security policy is associated with a derivation of an AF-specific session key, or the NF-specific security policy is associated with a derivation of an NF-specific session key.

20 Claims, 5 Drawing Sheets

SYSTEMS AND METHODS FOR PROVISIONING SECURITY POLICIES FOR DERIVING SESSION KEYS

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications. "Downlink" (or "DL") refers to a communication link from the network node to the UE, and "uplink" (or "UL") refers to a communication link from the UE to the network node.

DETAILED DESCRIPTION OF EXAMPLE EMBODIMENTS

Figure 1:
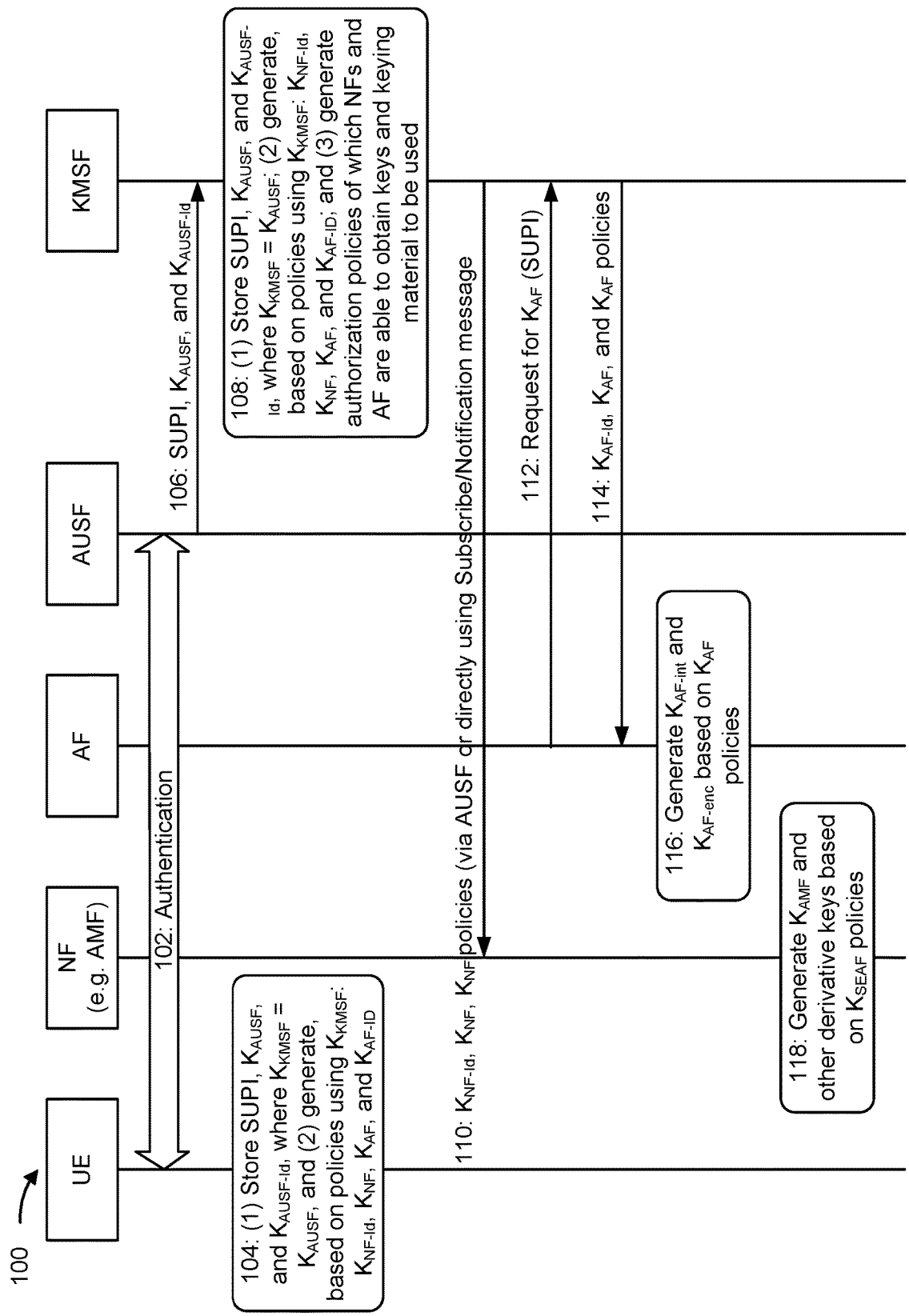
FIG. 1 is a diagram of an example associated with using security policies for deriving session keys.

The following detailed description of example implementations refers to the accompanying drawings. The same reference numbers in different drawings may identify the same or similar elements.

In a wireless communication system, such as a Third Generation Partnership Project (3GPP)-based wireless communication system, an authentication server function (AUSF) (or AUSF service) may be used to facilitate security processes. The AUSF may generate keys (e.g., authentication keys) and store the keys. A key generated by the AUSF may be used to authenticate an access request (e.g., a Fifth Generation (5G) access request) from a user equipment (UE). The key may be used to protect the integrity of steering or roaming (SoR) messages to the UE. The key may be used for authentication and key management for applications (AKMA). One key stored by the AUSF may be a $K_{AUSF}$, which may be a master session key (or a root key) that is available to the AUSF. The AUSF may use the $K_{AUSF}$ to generate other keys, such as a $K_{SEAF}$, which may be associated with a security anchor function (SEAF), or a $K_{AKMA}$, which may be associated with AKMA.

This realization of the AUSF may suffer from various limitations however. The AUSF may provide authentication, but may not provide authorization. The AUSF may provide integrity protection, but may not provide confidentiality protection. The AUSF may only handle authentication within a 3GPP domain. The AUSF may be unable to handle any keys generated outside the 3GPP domain. The AUSF may not have the capability to customize and tailor keying material. The AUSF may not be used for storing keys. Further, the AUSF may not utilize a hardware security module (HSM), and thereby may not provide high security assurance. As a result of such limitations, the level of security provided by the AUSF in the wireless communication system may be unsatisfactory, thereby degrading an overall performance of the wireless communication system.

When using the AUSF as specified in 3GPP, a 5G network may be negatively impacted in terms of the level of security, which may be due to the HSM not being supported by the AUSF. Further, when using the AUSF as specified in 3GPP, the 5G network may be negatively impacted in terms of scalability and performance, which may be due to the AUSF acting as a choke point in the 5G network for providing authentication and authorization services to network functions (NFs) and/or application functions (AFs).

In some implementations, a key management server function (KMSF) may generate a security policy. The KMSF may store the security policy locally at the KMSF. The security policy may be an AF-specific security policy (e.g., $K_{AF}$ policies) or an NF-specific security policy (e.g., $K_{NF}$ policies or $K_{SEAF}$ policies). The security policy may be customized based on an AF type, an NF type, an operator domain, or a UE trust level. The KMSF may transmit, to the AF and/or the NF, the security policy. The AF-specific security policy may be associated with a derivation of one or more AF-specific session keys (e.g., $K_{AF\text{-}int}$ and $K_{AF\text{-}enc}$). An AF-specific session key may provide integrity, confidentiality, and/or replay protection between a UE and an AF. The NF-specific security policy may be associated with a derivation of an NF-specific session key (e.g., $K_{AMF}$). The NF-specific session key may provide integrity, confidentiality, and/or replay protection between the UE and an NF. In some implementations, the KMSF may be a standalone server function. Alternatively, the KMSF may be associated with an AUSF functionality, where the KMSF may be a micro-service that is associated with the AUSF.

In some implementations, the KMSF may be introduced to overcome AUSF limitations and provide comprehensive authentication and authorization services for different use cases. A KMSF-based key (e.g., $K_{KMSF}$) may be a master session key or a root key that is shared between the KMSF and the UE. The KMSF-based key may correspond to an AUSF-based key (e.g., $K_{AUSF}$), which may be a master session key or a root key that is available to the AUSF. For example, the KMSF-based key may be the same as the AUSF-based key. The KMSF-based key may be used to generate NF-specific session keys per UE (e.g., $K_{AMF}$). The KMSF-based key may be used to generate AF-specific session keys (e.g., $K_{AF\text{-}int}$ and $K_{AF\text{-}enc}$). Such session keys may be provided after an authorization check. The KMSF may provide algorithms and/or other information when providing the keys. The keys may be used to provide end-to-end integrity, confidentiality, and/or replay protection between the UE and the NF/AF. In some implementations, the KMSF may be implemented as a standalone server function. The KMSF may be implemented as an enhanced AUSF functionality. For example, the KMSF may be another micro-service that is part of an AUSF but with increased security. Further, components that need high security assurance (e.g., a key derivation function (KDF) and/or key storage) may be run within a security environment (e.g., an HSM), thereby providing added security from tampering and leakage.

In some implementations, the KMSF may provide both authentication and authorization services, as opposed to the AUSF which only provides authorization services. The KMSF may generate keys that provide end-to-end integrity, confidentiality, and/or replay protection, as opposed to the AUSF that provides only integrity protection but not confidentiality protection. The KMSF may be capable of handling keys generated outside a 3GPP domain, where such capability may not be supported by the AUSF. Such examples of domains that are outside an operator's 3GPP domain may include standalone non-public networks (NPNs), non-standalone NPNs, or private networks that provide application services. The KMSF may be capable of handling keys generated outside a 3GPP domain, where such capability may not be supported by the AUSF. The KMSF may be capable of customizing and tailoring keying material, where such capability may not be supported by the AUSF. The KMSF may be capable of storing keys and employing an HSM to provide high security assurance, where such capabilities may not be supported by the AUSF. As a result, deploying the KMSF may overcome limitations associated with the AUSF. The KMSF may be a standalone entity and coexist with the AUSF, in which case the AUSF may still perform some security functions which are not performed by the KMSF. Alternatively, the KMSF may be integrated with the AUSF, which may result in an AUSF with enhanced capabilities. The KMSF may increase a level of security in a wireless communication system, thereby improving an overall performance of the wireless communication system.

FIG. 1 is a diagram of an example 100 associated with using security policies for deriving session keys, which may involve requesting, generating, transmitting, and/or storing the security policies and the session keys. As shown in FIG. 1, example 100 includes a user equipment (UE) (e.g., UE 302, described below and depicted in FIG. 3), an NF (e.g., an access and mobility management function (AMF) 324), an AF (e.g., AF 320), an AUSF (e.g., AUSF 316), and a KMSF (e.g., KMSF 330). The NF may be a gNodeB, a virtualized centralized unit (vCU), or any other radio component.

In some implementations, the KMSF may be a standalone server function in a 5G system. Alternatively, the KMSF may be associated with an AUSF functionality in the 5G system. For example, the KMSF may be a micro-service that is associated with the AUSF in the 5G system. Whether the KMSF is a standalone entity or whether the KMSF is integrated with the AUSF may be based on a design implementation, and may depend on complexity and/or associated costs. In some implementations, the AF may be internal to the 5G system, or the AF may be external to the 5G system.

As shown by reference number 102, the UE and the AUSF may perform an authentication (e.g., a 5G authentication), which may involve a 5G authentication and key agreement (5G-AKA) or an extensible authentication protocol authentication and key agreement prime (EAP-AKA'). As shown by reference number 104, the UE may store a subscription permanent identifier (SUPI) associated with the UE. The UE may store an AUSF-based key (e.g., $K_{AUSF}$), which may be a master session key (or a root key) that is available to the AUSF. The UE may store an AUSF-based key identifier (e.g., $K_{AUSF-Id}$), which may be a key identifier associated with the AUSF-based key. The UE may store the SUPI, the AUSF-based key, and the AUSF-based key identifier locally at the UE. The UE may generate the AUSF-based key and the AUSF-based key identifier for storage based on the authentication. The AUSF-based key may correspond to an KMSF-based key (e.g., $K_{KMSF}$), which may be a master session key or a root key that is available to the KMSF (e.g., $K_{KMSF}$ may equal $K_{AUSF}$). Reusing the AUSF-based key as the KMSF-based key may reduce complexity, especially when the KMSF is integrated with the AUSF. The UE may generate other keys based on security policies using the KMSF-based key. For example, the UE may generate an NF-based key, which may be a key associated with the NF. The NF-based key may be a SEAF-based key (e.g., $K_{SEAF}$), which may be a key associated with a SEAF NF. The UE may determine an NF-based key identifier (e.g., $K_{NF-Id}$), which may be a key identifier associated with the NF-based key. For example, the UE may determine an SEAF-based key identifier ($K_{SEAF-Id}$), which may be a key identifier associated with the SEAF-based key. The UE may generate an AF-based key (e.g., $K_{AF}$), which may be a key associated with the AF. The UE may determine an AF-based key identifier (e.g., $K_{AF-Id}$), which may be a key identifier associated with the AF-based key. The UE may generate the NF-based key, the NF-based key identifier, the AF-based key, and the AF-based key identifier based on the security policies using the KMSF-based key. These security policies may be stored locally on the UE. The security policies may be pre-provisioned by a network operator.

As shown by reference number 106, after the authentication, the AUSF may transmit the SUPI, the AUSF-based key, and the AUSF-based key identifier to the KMSF. As shown by reference number 108, the KMSF may store the SUPI, the AUSF-based key, and the AUSF-based key identifier locally at the KMSF. The KMSF may store the SUPI, the AUSF-based key, and the AUSF-based key identifier in an HSM associated with the KMSF. The KMSF may obtain the KMSF-based key, which may correspond to the AUSF-based key. In other words, the KMSF may derive the KMSF-based key based on the AUSF-based key. The KMSF may generate other keys using the KMSF-based key. The KMSF may generate the other keys based on security policies stored on the KMSF. For example, the KMSF may generate the NF-based key, the NF-based key identifier, the AF-based key, and the AF-based key identifier based on the security policies using the KMSF-based key. These security policies may be stored locally on the KMSF.

In certain cases, the KMSF may also generate an AMF-based key (e.g., $K_{AMF}$) using a SEAF-based key as an input and an AMF-based key identifier based on security policies. When the KMSF generated the AMF-based key, the AMF may not be expected to generate the AMF-based key. In certain cases, the KMSF may also generate a gNodeB-based key (e.g., KgNB) using the AMF-based key (e.g., $K_{AMF}$) as an input and a KgNB-based identifier. When the KMSF generated the gNodeB-based key, the AMF may not be expected to generate the gNodeB-based key. The gNode or a vCU may be provided with the gNodeB-based key identifier by the AMF to fetch the gNodeB-based key (e.g., KgNB). In certain cases, the AMF may provide the gNodeB or the vCU with only the gNodeB-based key identifier, and an address of the KMSF (e.g., fully qualified domain name: fqdn), which may then be used by the gNode or the vCU to fetch the gNodeB-based key from the KMSF.

In some implementations, the KMSF may generate the gNodeB-based key, and the KMSF may provide the gNodeB-based key to the gNodeB or the vCU. The KMSF may provide the gNodeB-based key via the AMF. Alternatively, the AMF may provide the gNodeB-based key identifier, and the gNodeB or the vCU may pull the gNodeB-based key from the KMSF via a request message. In some cases, the KMSF may provide the gNodeB-based key via a subscribe/notify mechanism, where the AMF may subscribe to the gNodeB-based key on behalf of the gNodeB or the vCU.

In some implementations, the KMSF may generate and/or utilize various security policies, which may be used by the NF and the AF to obtain keys and keying material. The security policies may include authorization policies. Such security policies may be different from the security policies stored locally on the UE and the KMSF, respectively, and used for generating the NF-based key, the NF-based key identifier, the AF-based key, and the AF-based key identifier. For example, the security policies may include NF-specific security policies (e.g., $K_{NF}$ security policies, which may include $K_{SEAF}$ security policies) and AF-specific security policies (e.g., $K_{AF}$ security policies). The NF-specific security policies may be associated with algorithms, key sizes, and/or types of protection (e.g., integrity and/or encryption), which may be used by the NF to obtain keys, generate derivative keys and keying material and a protection process (e.g., encryption, integrity protection, etc.) to be used by the NF. The AF-specific security policies may be associated with algorithms, key sizes, and/or types of protection (e.g., integrity or encryption), which may be used by the AF to obtain, generate derivative keys, keys and keying material and a protection process (e.g. encryption, integrity protection, etc.) to be used by the AF.

In some implementations, the KMSF may employ the various security policies (e.g., authorization policies). The security policies may be customized based on an NF type (e.g., $K_{NF}$ security policies, which may include $K_{SEAF}$ security policies). For example, a policy control function (PCF) may have a higher security assurance as compared to a session management function (SMF). The security policies may be customizable based on an AF type (e.g., $K_{AF}$ security policies). Certain applications that deal with a subscriber's application metadata that may have a higher risk for exposure and therefore may need a higher security assurance as compared to other applications that have a lower risk and therefore the need for lower security assurance. The security policies may be customizable based on the security policies being applied within an operator domain or outside the operator domain. The security policies may be customizable based on a UE trust level (e.g., corporate owned device versus bring your own device (BYOD)).

In some implementations, customized security policies may include security policies for key derivation (e.g., key size, protection level, and/or key refresh period). In other words, security polices for key derivation may be customizable. The customized security policies may include security policies for types of protection to be provided (e.g., integrity or confidentiality). The customized security policies may include particular algorithms that are needed for security, such as secure hash algorithm (SHA) 256-bit (SHA256), advanced encryption standard (AES) (e.g., AES-128/256), and/or certificates. The customized security policies may include types of asymmetric keys and/or symmetric key lengths to be used. The customized security policies may include a certificate or token issuance, and/or types of signing algorithms, such as elliptic curve digital signature algorithm (ECDSA).

As shown by reference number 110, the KMSF may transmit the NF-based key, the NF-based key identifier, and the NF-specific security policies to the NF. The KMSF may transmit the NF-based key, the NF-based key identifier, and the NF-specific security policies via the AUSF. For example, the KMSF may transmit the NF-based key, the NF-based key identifier, and the NF-specific security policies to the AUSF, and the AUSF may forward the NF-based key, the NF-based key identifier, and the NF-specific security policies to the NF. Alternatively, the KMSF may directly transmit the NF-based key, the NF-based key identifier, and the NF-specific security policies to the NF using subscribe/notification messages. The NF-specific security policies may be associated with a derivation of an NF-specific session key (e.g., by the NF). The NF-specific session key may provide integrity, confidentiality, and/or or replay protection between the UE and the NF.

As shown by reference number 112, the AF may transmit, to the KMSF, a request for the AF-based key and an indication of the SUPI. As shown by reference number 114, the KMSF may transmit, to the AF and based on the request, the AF-based key, the AF-based key identifier, and the AF-specific security policies. The KMSF may transmit the AF-based key and the AF-based key identifier, which may have been previously generated by the KMSF based on the security policies using KMSF-based key. The KMSF may transmit the AF-specific security policies, which may have been previously generated by the KMSF. The AF-specific security policies may be associated with a derivation of an AF-specific session key (e.g., by the AF). The AF-specific session key may provide integrity, confidentiality, and/or or replay protection between the UE and the AF.

As shown by reference number 116, the AF may generate the AF-specific session key based on the AF-specific security policies, which may have been previously received from the KMSF. The AF-specific session key may be used to generate multiple derivative AF-specific session keys. For example, the AF may generate an AF-based integrity key (e.g., $K_{AF\text{-}int}$), which may be an integrity key to be used by the AF for integrity protection, based on the AF-specific security policies. The AF may generate an AF-based encryption key (e.g., $K_{AF\text{-}enc}$), which may be an encryption key to be used by the AF for encryption, based on the AF-specific security policies. The derivative keys may be generated by using the AF-specific key as an input into a key derivation function (e.g., KDF) using pseudo-random functions (e.g. hash-based message authentication code (HMAC)-SHA-256 as the pseudo-random function). The AF-specific security policies may be based on the algorithms, key sizes, and/or types of protection (e.g., integrity or encryption). The AF may generate further derivative keys periodically using the AF-specific key as an input by means of a KDF using pseudo-random functions (e.g. HMAC-SHA-256 as the pseudo-random function). The periodic rotation of keys may be based on security policies.

As shown by reference number 118, the NF may generate the NF-specific session key based on the NF-specific security policies, which may have been previously received from the KMSF. For example, the NF may generate an AMF-based key (e.g., $K_{AMF}$), which may be a key to be used by the AMF (e.g., when the NF is the AMF), based on the NF-specific security policies. The NF may generate other derivative keys based on the NF-specific security policies. The NF-specific security policies may be based on the algorithms, key sizes, and/or types of protection (e.g., integrity or encryption). The AMF may generate further derivative keys periodically using the AMF-specific key (e.g., $K_{AMF}$) as an input by means of key derivation function (e.g. KDF) using pseudo-random functions (e.g. HMAC-SHA-256 as the pseudo-random function) or a defined by the relevant 3GPP standards. The periodic rotation of keys may be based on security policies.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
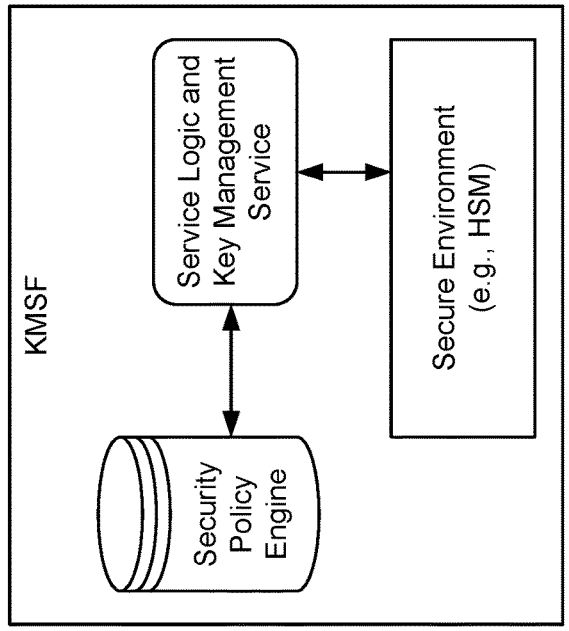
FIG. 2 is a diagram of an example associated with a key management server function (KMSF) capable of applying customized security policies.

FIG. 2 is a diagram of an example 200 associated with a KMSF capable of applying customized security policies. As shown in FIG. 2, example 200 includes the KMSF (e.g., KMSF 330).

As shown in FIG. 2, the KMSF may include a security policy engine, a service logic and key management service, and a secure environment, such as an HSM. The service logic and key management service may utilize the security policy engine and the secure environment. The KMSF, using the security policy engine, the service logic and key management service, and/or the secure environment, may store master session keys (e.g., a $K_{AUSF}$), generate derivative keys (e.g., a $K_{AF}$, which may include a $K_{SEAF}$), and/or customize NF-specific keys.

In some implementations, the security policy engine may store various security policies, such as customized security policies. The customized security policies may be based on NF type (e.g., $K_{NF}$ security policies). The customized security policies may be based on AF type (e.g., $K_{AF}$ security policies). The customized security policies may be based on operator domain. The customizable security policies may be based on a UE trust level (e.g., corporate owned device versus BYOD). In some implementations, the customized security policies may include security policies for key derivation (e.g., key size, protection level, and/or refresh period). The customized security policies may include security policies for types of protection to be provided (e.g., integrity or confidentiality). The customized security policies may include particular algorithms that are needed for security. The customized security policies may include a certificate or token issuance, and/or types of signing algorithms.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
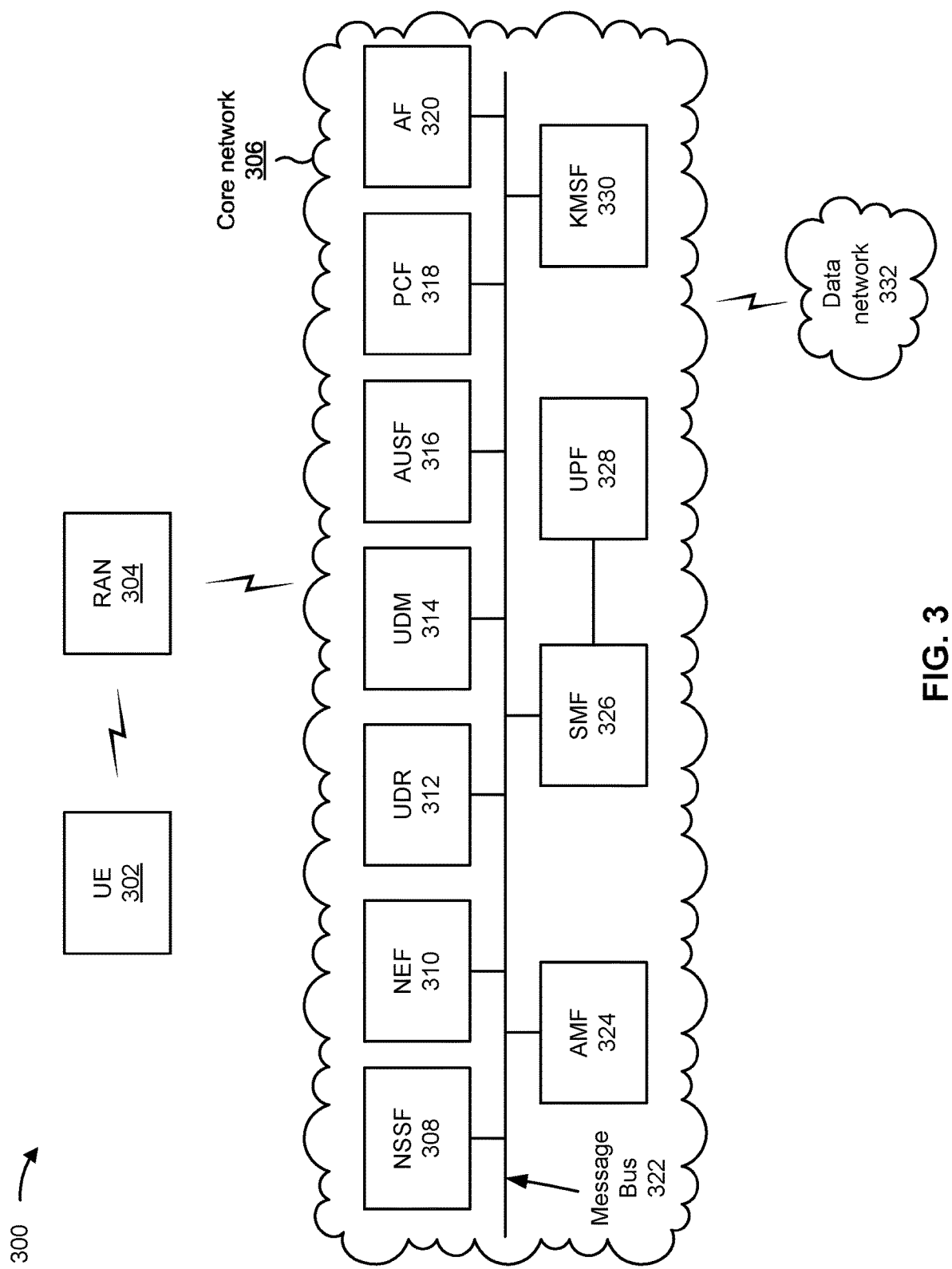
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include a UE 302, a radio access network (RAN) 304, a core network 306, and a data network 332. Devices and/or networks of example environment 300 may interconnect via wired connections, wireless connections, or a combination of wired and wireless connections.

The UE 302 may include one or more devices capable of receiving, generating, storing, processing, and/or providing information, such as information described herein. For example, The UE 302 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 304 may support, for example, a cellular radio access technology (RAT). The RAN 304 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 302. The RAN 304 may transfer traffic between the UE 302 (e.g., using a cellular RAT), one or more base stations (e.g., using a wireless interface or a backhaul interface, such as a wired backhaul interface), and/or the core network 306. The RAN 304 may provide one or more cells that cover geographic areas.

In some implementations, the RAN 304 may perform scheduling and/or resource management for the UE 302 covered by the RAN 304 (e.g., the UE 302 covered by a cell provided by the RAN 304). In some implementations, the RAN 304 may be controlled or coordinated by a network controller, which may perform load balancing, network-level configuration, and/or other operations. The network controller may communicate with the RAN 304 via a wireless or wireline backhaul. In some implementations, the RAN 304 may include a network controller, a self-organizing network (SON) module or component, or a similar module or component. In other words, the RAN 304 may perform network control, scheduling, and/or network management functions (e.g., for uplink, downlink, and/or sidelink communications of the UE 302 covered by the RAN 304).

In some implementations, the core network 306 may include an example functional architecture in which systems and/or methods described herein may be implemented. For example, the core network 306 may include an example architecture of a fifth generation (5G) next generation (NG) core network included in a 5G wireless telecommunications system. While the example architecture of the core network 306 shown in FIG. 3 may be an example of a service-based architecture, in some implementations, the core network 306 may be implemented as a reference-point architecture and/or a 4G core network, among other examples.

As shown in FIG. 3, the core network 306 include a number of functional elements. The functional elements may include, for example, a network slice selection function (NSSF) 308, a network exposure function (NEF) 310, a unified data repository (UDR) 312, a unified data management (UDM) 314, an AUSF 316, a PCF 318, an AF 320, an NF such as an AMF 324, an SMF 326, a user plane function (UPF) 328, and/or a KMSF 330. These functional elements may be communicatively connected via a message bus 322. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 308 may include one or more devices that select network slice instances for the UE 302. By providing network slicing, the NSSF 308 may allow an operator to deploy multiple substantially independent end-to-end networks potentially with the same infrastructure. In some implementations, each slice may be customized for different services. The NEF 310 may include one or more devices that support exposure of capabilities and/or events in the wireless telecommunications system to help other entities in the wireless telecommunications system discover network services.

The UDR 312 may include one or more devices that provide a converged repository, which may be used by network functions to store data. For example, a converged repository of subscriber information may be used to service a number of network functions. The UDM 314 may include one or more devices to store user data and profiles in the wireless telecommunications system. The UDM 314 may generate AKA authentication vectors, perform user identification handling, perform subscription management, and perform other various functions. The UDM 314 may be used for fixed access and/or mobile access in the core network 306. The AUSF 316 may include one or more devices that act as an authentication server and support the process of authenticating the UE 302 in the wireless telecommunications system.

The PCF 318 may include one or more devices that provide a policy framework that incorporates network slicing, roaming, packet processing, and/or mobility management, among other examples. The AF 320 may include one or more devices that support application influence on traffic routing, access to the NEF 310, and/or policy control, among other examples. The AMF 324 may include one or more devices that act as a termination point for non-access stratum (NAS) signaling and/or mobility management, among other examples. The SMF 326 may include one or more devices that support the establishment, modification, and release of communication sessions in the wireless telecommunications system. For example, the SMF 326 may configure traffic steering policies at the UPF 328 and/or may enforce user equipment IP address allocation and policies, among other examples. The UPF 328 may include one or more devices that serve as an anchor point for intra-RAT and/or inter-RAT mobility. The UPF 328 may apply rules to packets, such as rules pertaining to packet routing, traffic reporting, and/or handling user plane quality of service (QOS), among other examples. The KMSF 330 may include one or more devices that provide authentication and authorization services, as described herein. The message bus 322 may represent a communication structure for communication among the functional elements. In other words, the message bus 322 may permit communication between two or more functional elements.

The data network 332 may include one or more wired and/or wireless data networks. For example, the data network 332 may include an IP multimedia subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
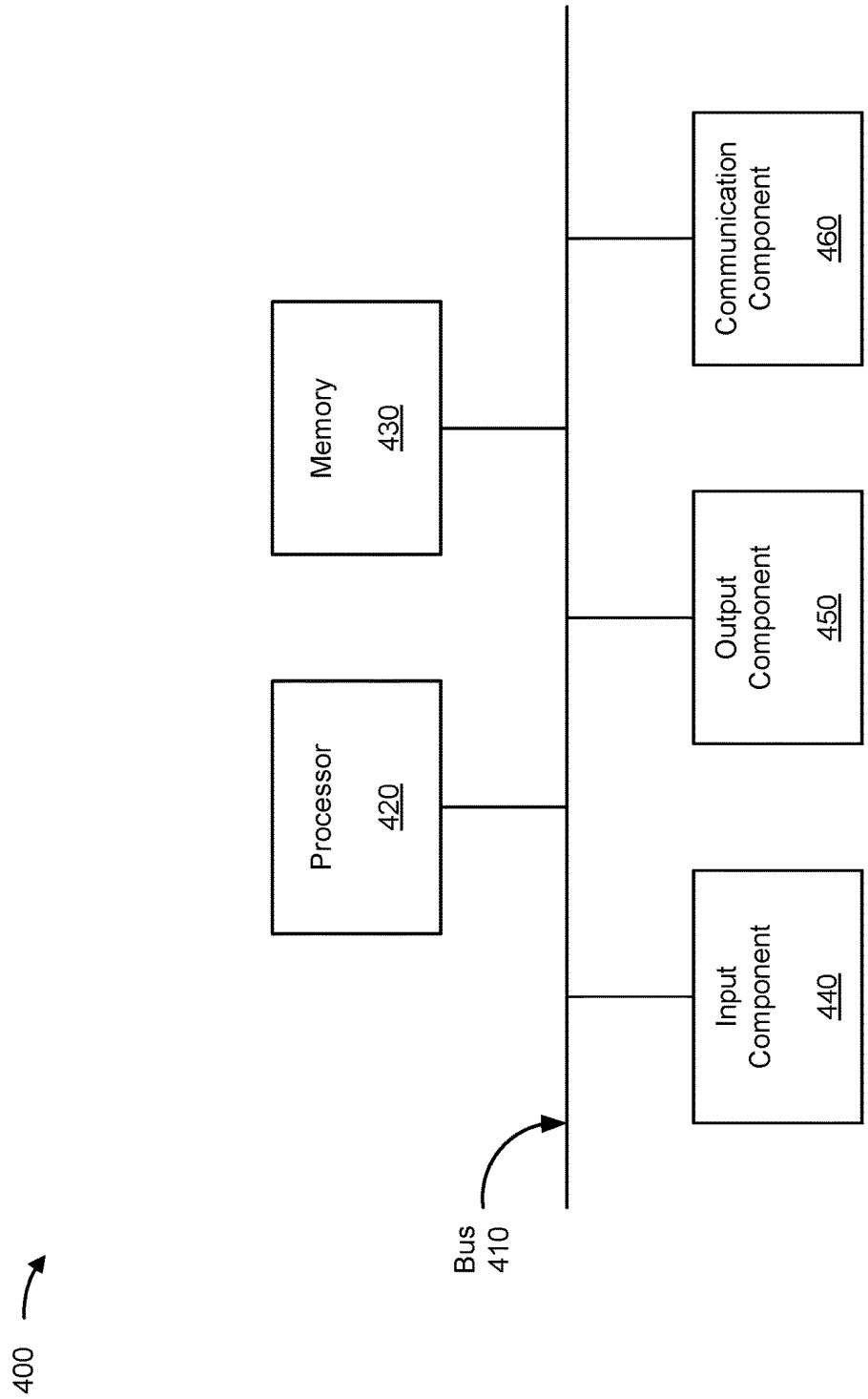
FIG. 4 is a diagram of example components of one or more devices of FIG. 3.

FIG. 4 is a diagram of example components of a device 400 associated with securely storing session keys. The device 400 may correspond to a KMSF (e.g., KMSF 330). In some implementations, the KMSF may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
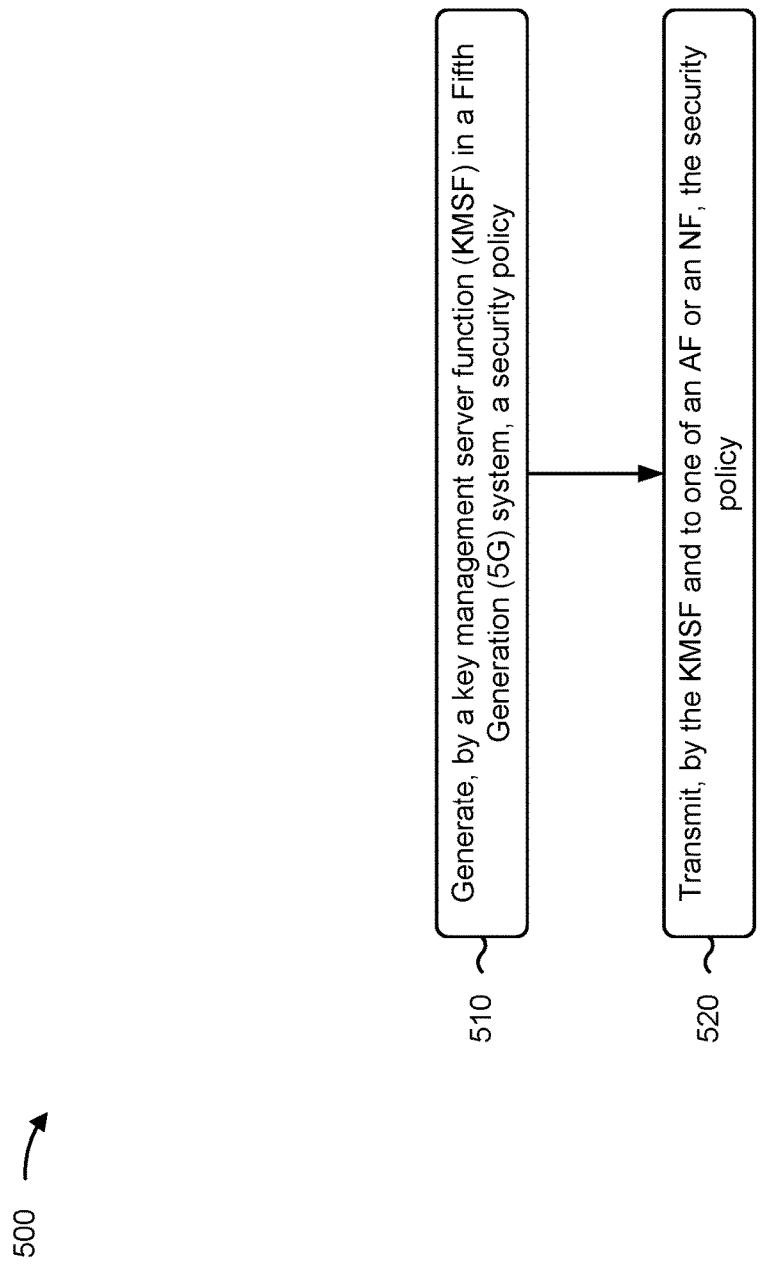
FIG. 5 is a flowchart of an example process associated with using security policies for deriving session keys.

FIG. 5 is a flowchart of an example process 500 associated with using security policies for deriving session keys. In some implementations, one or more process blocks of FIG. 5 may be performed by a KMSF (e.g., KMSF 330). In some implementations, one or more process blocks of FIG. 5 may be performed by another device or a group of devices separate from or including the KMSF, such as a UE (e.g., UE 302), an NF (e.g., AMF 324), an AF (e.g., AF 320), or an AUSF (e.g., AUSF 316). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include generating, by the KMSF in a 5G system, a security policy, wherein the security policy is an AF-specific security policy or an NF-specific security policy (block 510). The security policy may be customized based on an AF type, an NF type, an operator domain, and/or a UE trust level. The security policy may include information associated with a KDF (e.g., key size, protection level, or key refresh rate), types of protection (e.g., integrity of confidentiality), security algorithms (e.g., SHA256, AES-128/256, or certificates), types of asymmetric keys, symmetric key lengths, a certificate issuance, a token issuance, and/or types of signing algorithms (e.g., ECDSA). The AF may be internal to the 5G system, or the AF may be external to the 5G system.

As shown in FIG. 5, process 500 may include transmitting, by the KMSF and to one of an AF or an NF, the security policy, wherein the AF-specific security policy is associated with a derivation of an AF-specific session key, or the NF-specific security policy is associated with a derivation of an NF-specific session key (block 520). For example, the AF may derive the AF-specific session key based on the AF-specific security policy. The NF may derive the NF-specific session key based on the NF-specific security policy.

In some implementations, the KMSF may receive, from an AUSF, an indication of a SUPI associated with a UE, an AUSF-based key, and an AUSF-based key identifier. The KMSF may store the SUPI, the AUSF-based key, and the AUSF-based key identifier in an HSM associated with the KMSF. The KMSF may store the security policy. The KMSF may derive a KMSF-based key based on the AUSF-based key, wherein the KMSF-based key corresponds to the AUSF-based key.

In some implementations, the KMSF may generate, based on the KMSF-based key, an NF-based key, an NF-based key identifier, an AF-based key, and an AF-based key identifier. The KMSF may transmit, to the NF, the NF-based key, the NF-based key identifier, and the NF-specific security policy, wherein the NF-specific session key is derived based on the NF-specific security policy. The NF-specific session key may provide one or more of: integrity, confidentiality, or replay protection between the UE and the NF.

In some implementations, the KMSF may transmit, via an AUSF, the NF-based key, the NF-based key identifier, and the NF-specific security policy. Alternatively, the KMSF may transmit, directly to the NF using a subscribe or notification message, the NF-based key, the NF-based key identifier, and the NF-specific security policy.

In some implementations, the KMSF may receive, from the AF, a request for the AF-based key. The KMSF may transmit, to the AF, the AF-based key, the AF-based key identifier, and the AF-specific security policy, wherein the AF-specific session key is derived based on the AF-specific security policy. The AF-specific session key may provide one or more of: integrity, confidentiality, or replay protection between the UE and the AF. The AF-specific session key may include multiple AF-specific session keys, and the multiple AF-specific session keys may include an AF-based integrity key and an AF-based encryption key.

In some implementations, the KMSF may be a standalone server function. Alternatively, the KMSF may be associated with an AUSF functionality. The KMSF may be a microservice that is associated with the AUSF.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is Intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a key management server function (KMSF) in a Fifth Generation (5G) system and from an authentication server function (AUSF), an AUSF-based key, and an AUSF-based key identifier;
   deriving, by the KMSF, a KMSF-based key based on the AUSF-based key;
   generating, by the KMSF, a security policy, wherein the security policy is an application function (AF)-specific security policy or a network function (NF)-specific security policy;
   storing, by the KMSF, the AUSF-based key, and the AUSF-based key identifier in a hardware security module (HSM) associated with the KMSF;
   storing, by the KMSF, the security policy; and
   transmitting, by the KMSF and to one of an AF or an NF, the security policy, wherein the AF-specific security policy is associated with a derivation of an AF-specific session key, or the NF-specific security policy is associated with a derivation of an NF-specific session key.

2. The method of claim 1, wherein:
   the security policy is customized based on one or more of: an AF type, an NF type, an operator domain, or a user equipment (UE) trust level;
   the security policy includes information associated with one or more of: a key derivation function (KDF), types of protection, security algorithms, types of asymmetric keys, symmetric key lengths, a certificate issuance, a token issuance, or types of signing algorithms; and
   the AF is internal to the 5G system or the AF is external to the 5G system.

3. The method of claim 1, further comprising:
   receiving, by the KMSF and from the AUSF, an indication of a subscription permanent identifier (SUPI) associated with a user equipment (UE); and
   storing, by the KMSF, the SUPI in the HSM associated with the KMSF.

4. The method of claim 1, further comprising:
   receiving, by the KMSF, a unique application identifier associated with the AF;
   generating, by the KMSF and based on the KMSF-based key, an NF-based key, an NF-based key identifier, an AF-based key, and an AF-based key identifier, wherein the AF-based key is generated based on the unique application identifier associated with the AF; and
   transmitting, by the KMSF and to the NF, the NF-based key, the NF-based key identifier, and the NF-specific security policy, wherein the NF-specific session key is derived based on the NF-specific security policy.

5. The method of claim 4, further comprising:
   transmitting, by the KMSF and via the AUSF, the NF-based key, the NF-based key identifier, and the NF-specific security policy; or
   transmitting, by the KMSF and directly to the NF using a subscribe or notification message, the NF-based key, the NF-based key identifier, and the NF-specific security policy.

6. The method of claim 4, further comprising:
   receiving, by the KMSF and from the AF, a request for the AF-based key; and transmitting, by the KMSF and to the AF, the AF-based key, the AF-based key identifier, and the AF-specific security policy, wherein the AF-specific session key is derived based on the AF-specific security policy,
  wherein the AF-specific session key includes multiple AF-specific session keys, and the multiple AF-specific session keys include an AF-based integrity key and an AF-based encryption key.

7. The method of claim 1, wherein:
the AF-specific session key provides one or more of: integrity, confidentiality, or replay protection between a user equipment (UE) and the AF; or
the NF-specific session key provides one or more of: integrity, confidentiality, or replay protection between the UE and the NF.

8. The method of claim 1, wherein:
the KMSF is a standalone server function; or
the KMSF is associated with an AUSF functionality, and the KMSF is a micro-service that is associated with the AUSF.

9. A device, comprising:
one or more processors configured to:
  receive a unique application identifier associated with an application function (AF);
  generate a security policy, wherein the security policy is an AF-specific security policy or a network function (NF)-specific security policy;
  generate an NF-based key or an AF-based key, wherein the AF-based key is generated based on the unique application identifier associated with the AF; and
  transmit, to one of an AF or an NF in a Fifth Generation (5G) system, the security policy and at least one of the NF-based key or the AF-based key,
    wherein an AF-specific session key is derived based on the AF-specific security policy, or
    wherein an NF-specific session key is derived based on the NF-specific security policy.

10. The device of claim 9, wherein:
the security policy is customized based on one or more of: an AF type, an NF type, an operator domain, or a user equipment (UE) trust level;
the security policy includes information associated with one or more of: a key derivation function (KDF), types of protection, security algorithms, types of asymmetric keys, symmetric key lengths, a certificate issuance, a token issuance, or types of signing algorithms; and
the AF is internal to the 5G system or the AF is external to the 5G system.

11. The device of claim 9,
wherein the one or more processors are further configured to:
  receive, from an authentication server function (AUSF), an indication of a subscription permanent identifier (SUPI) associated with a user equipment (UE), an AUSF-based key, and an AUSF-based key identifier; and
  store the SUPI, the AUSF-based key, and the AUSF-based key identifier in a hardware security module (HSM).

12. The device of claim 9,
wherein the one or more processors are further configured to:
  generate the NF-based key, an NF-based key identifier, the AF-based key, and an AF-based key identifier; and
  transmit, to the NF, the NF-based key, the NF-based key identifier, and the NF-specific security policy.

13. The device of claim 12,
wherein the one or more processors are further configured to:
  transmit, via an authentication server function (AUSF), the NF-based key, the NF-based key identifier, and the NF-specific security policy; or
  transmit, directly to the NF using a subscribe or notification message, the NF-based key, the NF-based key identifier, and the NF-specific security policy.

14. The device of claim 12,
wherein the one or more processors are further configured to:
  receive, from the AF, a request for the AF-based key; and
  transmit, to the AF, the AF-based key, the AF-based key identifier, and the AF-specific security policy, wherein the AF-specific session key is derived based on the AF-specific security policy,
    wherein the AF-specific session key includes multiple AF-specific session keys, and the multiple AF-specific session keys include an AF-based integrity key and an AF-based encryption key.

15. The device of claim 9, wherein:
the AF-specific session key provides one or more of: integrity, confidentiality, or replay protection between a user equipment (UE) and the AF; or
the NF-specific session key provides one or more of: integrity, confidentiality, or replay protection between the UE and the NF.

16. The device of claim 9,
wherein the device is associated with a key management server function (KMSF).

17. A non-transitory computer-readable medium storing a set of instructions, the set of instructions comprising:
one or more instructions that, when executed by one or more processors of a device, cause the device to:
  receive a unique application identifier associated with an application function (AF);
  generate a security policy, wherein the security policy is an AF-specific security policy or a network function (NF)-specific security policy;
  generate an NF-based key or an AF-based key, wherein the AF-based key is generated based on the unique application identifier associated with the AF; and
  transmit, to one of an AF or an NF in a Fifth Generation (5G) system, the security policy and at least one of the NF-based key or the AF-based key,
    wherein an AF-specific session key is derived based on the AF-specific security policy, or
    wherein an NF-specific session key is derived based on the NF-specific security policy.

18. The non-transitory computer-readable medium of claim 17,
wherein the one or more instructions, when executed by the one or more processors, further cause the device to:
  generate the NF-based key, an NF-based key identifier, the AF-based key, and an AF-based key identifier; and
  transmit, to the NF, the NF-based key, the NF-based key identifier, and the NF-specific security policy.

19. The non-transitory computer-readable medium of claim 17,
wherein the one or more instructions, when executed by the one or more processors, further cause the device to:
  receive, from the AF, a request for the AF-based key; and transmit, to the AF, the AF-based key, an AF-based key identifier, and the AF-specific security policy, wherein the AF-specific session key is derived based on the AF-specific security policy, wherein the AF-specific session key includes multiple AF-specific session keys, and the multiple AF-specific session keys include an AF-based integrity key and an AF-based encryption key.

20. The non-transitory computer-readable medium of claim 17, wherein the device is associated with a key management server function (KMSF).

* * * * *